United States Patent
Sung et al.

(10) Patent No.: US 9,097,924 B2
(45) Date of Patent: Aug. 4, 2015

(54) DISPLAY DEVICE

(71) Applicant: InnoLux Corporation, Miao-Li County (TW)

(72) Inventors: Li-Wei Sung, Miao-Li County (TW); Yu-Chien Kao, Miao-Li County (TW); Hui-Min Huang, Miao-Li County (TW); Mei-Ling Kuo, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 145 days.

(21) Appl. No.: 13/804,980

(22) Filed: Mar. 14, 2013

(65) Prior Publication Data
US 2014/0078428 A1 Mar. 20, 2014

(30) Foreign Application Priority Data
Sep. 14, 2012 (TW) .............................. 101133610 A

(51) Int. Cl.
*G02F 1/1339* (2006.01)
*G02F 1/1345* (2006.01)
*G02F 1/1337* (2006.01)
*G02F 1/1333* (2006.01)

(52) U.S. Cl.
CPC ...... *G02F 1/133345* (2013.01); *G02F 1/13452* (2013.01); *G02F 1/1345* (2013.01); *G02F 1/13394* (2013.01); *G02F 1/133707* (2013.01); *G02F 2001/133388* (2013.01)

(58) Field of Classification Search
USPC ......................................................... 349/153
See application file for complete search history.

(56) References Cited

U.S. PATENT DOCUMENTS

| | | | | |
|---|---|---|---|---|
| 5,889,569 A | * | 3/1999 | Okamoto et al. | 349/110 |
| 5,910,829 A | * | 6/1999 | Shimada et al. | 349/110 |
| 2006/0139554 A1 | * | 6/2006 | Park | 349/152 |
| 2009/0251651 A1 | * | 10/2009 | Obi et al. | 349/138 |
| 2009/0290085 A1 | * | 11/2009 | Chang et al. | 349/54 |
| 2011/0194064 A1 | * | 8/2011 | Lee | 349/153 |

FOREIGN PATENT DOCUMENTS

TW 200413798 8/2004

OTHER PUBLICATIONS

TW Office Action dated Nov. 20, 2014.
English Abstract translation of TW200413798 (Published Aug. 1, 2004).

* cited by examiner

*Primary Examiner* — Wen-Ying P Chen
(74) *Attorney, Agent, or Firm* — McClure, Qualey & Rodack, LLP

(57) ABSTRACT

A display device includes a first substrate, a second substrate, a plurality of pixel units, a driving unit, and column insulation structure. The first substrate has a display area and a non-display area outside of the display area. The pixel units are formed at the display area of the first substrate and configured to receive an output signal. Formed at the non-display area of the first substrate, the driving unit includes first and second conductive layers, and first and second insulation layers which are alternately arranged. The connecting layer is connected between the first and second conductive layers via the through-holes formed at the first and second insulation layers. The column insulation structure corresponds to the connecting layer and is formed between the first and second substrates.

11 Claims, 3 Drawing Sheets

DISPLAY DEVICE

CROSS REFERENCE TO RELATED APPLICATIONS

This Application claims priority of Taiwan Patent Application No. 101133610, filed on Sep. 14, 2012, the entirety of which is incorporated by reference herein.

BACKGROUND OF THE INVENTION

1. Field of the Invention

The present invention relates to a display device, and in particular to a display device with one or more than one column insulation structure disposed in a non-display area thereof.

2. Description of the Related Art

A liquid-crystal display panel mainly includes a color filter substrate, a thin-film transistor (TFT) array substrate, and liquid-crystal layer sandwiched between the two substrates. The TFT array substrate controls the light transmittance characteristics of liquid-crystal material found within the two substrates by adjusting an electric field to produce an image.

Generally, the liquid-crystal panel includes a display area in the central area of the panel, an edge area surrounding the display area, and a sealing area in the outer periphery of the panel. Located at the center of the panel, the display area serves as an area for displaying an image, and elements not used for displaying the image, such as trace lines, and testing members, are disposed in the surrounding edge area. The sealing area in the outer periphery completely surrounds the display panel, and a sealing agent is applied thereto to combine the TFT array substrate and the color filter substrate.

In the edge area of the liquid-crystal panel, the output signal is supplied by conductive traces, and the conductive traces are connected to one another through a connecting layer. In one example, the output signal is switched between a high-voltage level (such as 15V) and a low-voltage level (such as −10V). On the other hand, the voltage that is applied to the common electrode on the color filter substrate maintains a constant voltage (such as 5V) or is switched between a high-voltage level (such as 3.53V) and a low-voltage level (such as −1.13V). The voltage difference (electric field) between the connecting layer and the common electrode may cause corrosion of the connecting layer, and the liquid-crystal panel tends to deteriorate accordingly.

BRIEF SUMMARY OF THE INVENTION

In order to address the drawbacks of the prior art, the application provides a display panel in which the electric field generated by the voltage difference between the connecting layer and the common electrode can be shielded.

In one exemplary embodiment, the display device includes a display panel including a first substrate, a second substrate, a plurality of pixel units, a driving unit, and column insulation structure. The first substrate has a display area and a non-display area outside of the display area. The pixel units are formed at the display area of the first substrate and configured to receive an output signal. The driving unit is formed at the non-display area of the first substrate and includes first and second conductive layers, and first and second insulation layers and a connecting layer, wherein the first and second conductive layers, and the first and second insulation layers are arranged alternately, and the connecting layers electrically connect the first conductive layer to the second conductive layer via the through-hole formed at the first and second insulation layers. The column insulation structure corresponds to the connecting layers and is formed between the first substrate and the second substrate.

In one embodiment, a width of the surface of the column insulation structure facing the connecting layer in a horizontal direction is greater than or equal to half of a width of the connecting layer in the horizontal direction, and the width of the surface of the column insulation structure facing the connecting layer in a vertical direction is greater than or equal to half of a width of the connecting layer in the vertical direction. Additionally, a width of the column insulation structure in the horizontal direction is greater than or equal to a width of the through-hole in the horizontal direction.

In one embodiment, the display device further includes a liquid-crystal material disposed in the display area, wherein the column insulation structure has a dielectric coefficient which is smaller than the highest dielectric coefficient of the liquid-crystal material. The connecting layer is formed of a material selected from ITO (Indium Tin Oxide), IZO (Indium Zinc Oxide), Al, Cu, and Mo.

In one embodiment, the display device further includes a common electrode formed on the inner surface of the second substrate, wherein the voltage that is applied to the common electrode is different from the voltage that is applied to the connecting layer, and wherein the column insulation structure is formed on the common electrode.

In one embodiment, the driving unit further includes at least one supporting structure facing the column insulation structure and extruding in a direction toward the column insulation structure, wherein the driving unit includes two supporting structures, and the connecting layer is disposed between the two supporting structures. The two supporting structures are made of an electrical conductor material, or are electrical insulators.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Several exemplary embodiments of the application are described with reference to FIGS. 1 through 3, which generally relate to the generation of a secret key. It is to be understood that the following disclosure provides various different embodiments as examples for implementing different features of the application. This description is made for the purpose of illustrating the general principles of the invention and should not be taken in a limiting sense.

Figure 1:
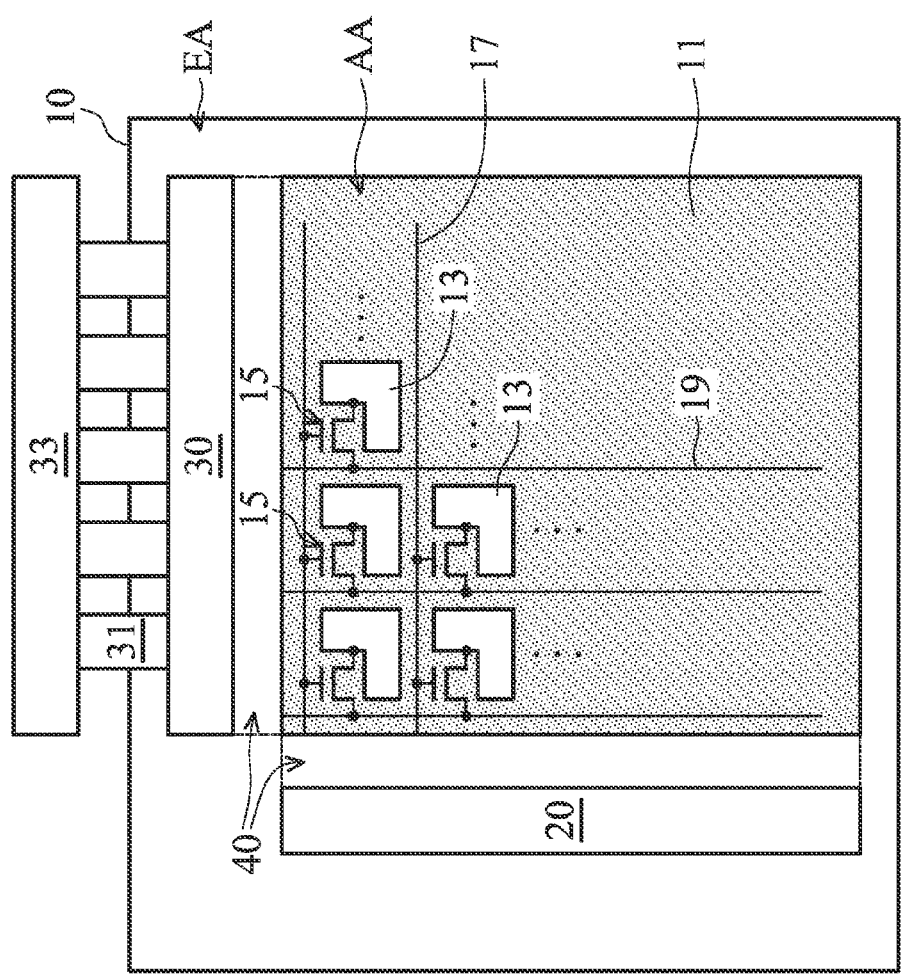
FIG. 1 shows a schematic view of a first substrate of a display device in accordance with one of the embodiments of the present disclosure.

Referring to FIG. 1, the display panel of the display device 1 in accordance with one of the embodiments includes a first substrate 10. The first substrate 10 has a display area AA, and a non-display area EA outside of the display area AA. Liquid-crystal material 11, a plurality of pixel units 13, a plurality of thin-film transistors 15, a plurality of scanning lines 17 and a plurality of data lines 19 are formed at the display area AA of the first substrate 10, and two driving units 20 and 30 are formed at the non-display area EA of the first substrate 10. At least one of the two driving units 20 and 30 includes an interconnection circuit 40, and the interconnection circuit 40 is disposed at the non-display area EA of the first substrate 10. In the embodiment, the driving unit 20 is a scanning line driving circuit, and the driving unit 30 is a data line driving circuit, wherein the scanning line driving circuit 20 and the data line driving circuit 30 are respectively connected to the scanning lines 17 and the data lines 19 through the interconnection circuits 40.

Specifically, the scanning line driving circuit 20 is connected to the scanning lines 17 through the interconnection circuit 40 and applies an output signal to the thin-film transistors 15 through the scanning lines 17 so as to control the on/off state of the thin-film transistors 15. The data line driving circuit 30 is connected to at least one printed circuit board 33 by a flexible circuit board 31 for receiving control signals from the printed circuit board 33 and further converting the control signals to output signals. The output signals are transmitted to each of the thin-film transistors 15 through the data lines 19 and the interconnection circuit 40 so as to supply a driving voltage to the pixel units 13 to control the liquid-crystal materials 11.

Figure 2:
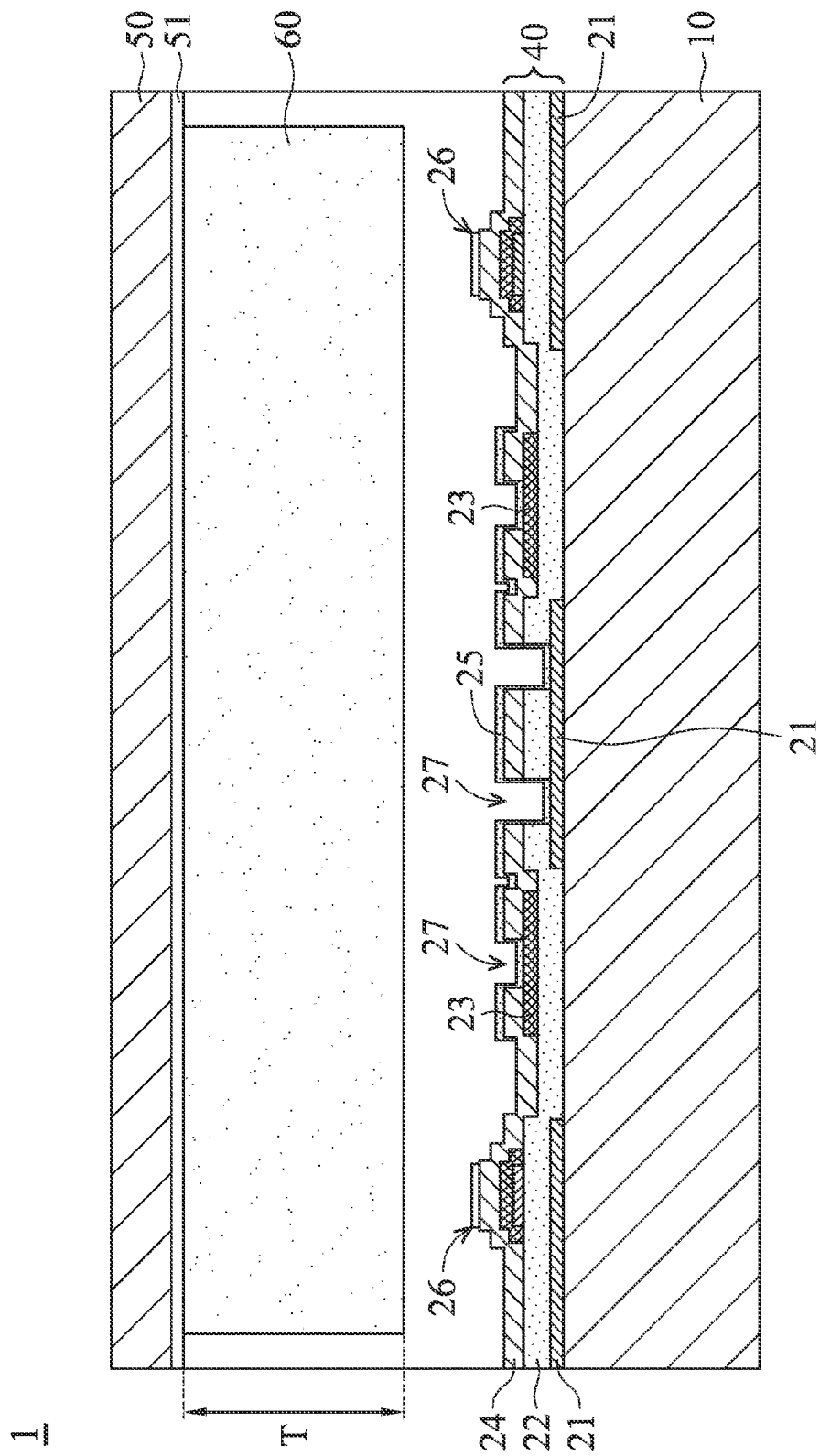
FIG. 2 shows a cross-sectional view of the display device in accordance with one of the embodiments of the present disclosure.

Referring to FIG. 2, the interconnection circuit 40 includes a first conductive layer 21, a first insulation layer 22, a second conductive layer 23, a second insulation layer 24, a plurality of connecting layers 25 and a plurality of supporting structures 26 (only one connecting layer and two supporting structures are depicted in FIG. 2 for simplification). The first conductive layer 21 is formed on the first substrate 10 and configured to supply an output signal to the pixel units 13 (FIG. 1). The first insulation layer 22 is formed on the first conductive layer 21 and the first substrate 10. The second conductive layer 23 is formed on the first insulation layer 22. The second insulation layer 24 is formed on the second conductive layer 23.

Note that the first conductive layer 21 is exposed to the outside via the through-hole 27 of the first insulation layer 22, and the second conductive layer 23 is exposed to the outside via the through-hole 27 of the second insulation layer 24, wherein the connecting layers 25 are electrically connected between the first conductive layer 21 and the second conductive layer 23 by passing through the through-holes 27. The connecting layers 25 are formed of a material selected from ITO, IZO, Al, Cu, and Mo. The supporting structures 26 are located at two opposite sides of the connecting layers 25, wherein the supporting structures 26 may be formed of an electrically conductive material or an electrically insulating material.

As shown in FIG. 2, the display device 1 further includes a second substrate 50 and a plurality of column insulation structures 60 (only one column insulation structure is depicted in FIG. 2 for simplification). The second substrate 50 faces the first substrate 10, and the inner surface of the second substrate 50 includes a common electrode 51 disposed thereon, wherein a voltage that is applied to the common electrode 51 is different from a voltage that is applied to the connecting layer 25. Corresponding to the connecting layer 25, the column insulation structures 60 are formed between the first and second substrates 10 and 50. Specifically, the column insulation structures 60 are formed on the common electrode 51 of the second substrate 50 relative to the connecting layer 25 of the interconnection circuit 40, and the connecting layer 25 is disposed between the two supporting structures 26, wherein the two supporting structures 26 respectively face the column insulation structures 60 and extrude in a direction toward the column insulation structures 60. Therefore, the spacer formed between the column insulation structures 60 and the two supporting structure 26 is smaller than the spacer formed between the column insulation structures 60 and the connecting layer 25. Due to the difference in the thickness of the interconnection circuit 40, the failure of the connecting layer 25 can be avoided while the display device 1 is compressed.

Note that in order to achieve the objective of shielding the electric field, the thickness T of the column insulation structures 60 in a vertical direction (thickness direction of the display device 1) may preferably range from 0.5 um to 7 um; however, the thickness of the column insulation structures 60 may be modified according to demand. In addition, a better shielding effect for the liquid-crystal material 11 (FIG. 1) can be provided by selecting the dielectric coefficient of the column insulation structures 60. For example, to prevent the liquid-crystal material 11 from electromagnetic interference, the column insulation structure 60 should have a dielectric coefficient which is smaller than the highest dielectric coefficient of the liquid-crystal material 11. In one unlimited embodiment, the column insulation structure 60 has a dielectric coefficient ranging from 0.5 to 7 um.

It should be understood that although the column insulation structures 60 are formed on the common electrode 51 of the second substrate 50, it should not be limited thereto. The objective for shielding the electric field can be achieved, if the column insulation structures 60 are positioned between the common electrode 51 of the second substrate 50 and the connecting layer 25. In the other embodiment, the column insulation structures are formed on the connecting layer for shielding the electric field.

Figure 3:
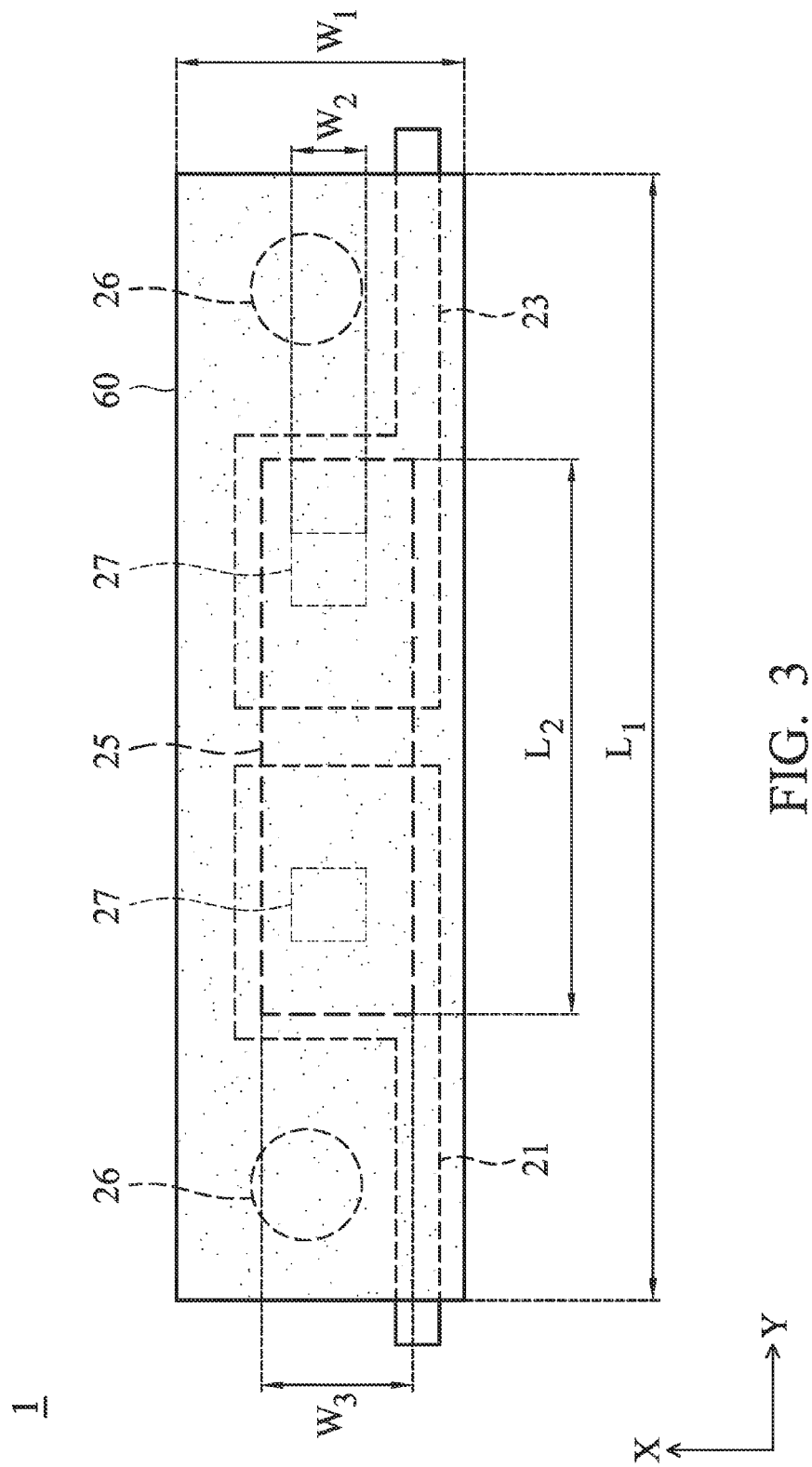
FIG. 3 shows a top view of partial elements of the display device in accordance with one of the embodiments of the present disclosure.

Referring to FIG. 3 which shows a top view of the display device 1 showing in FIG. 2, wherein only the first conductive layer 21, the second conductive layer 23, the connecting layer 25, the supporting structures 26, and the column insulation structures 60 are shown in FIG. 3 for simplification. In one unlimited embodiment, to sufficiently shield the electric field, a width $W_1$ of one of the column insulation structures 60 in a horizontal direction (X direction) is greater than or equal to a width $W_2$ of the corresponding through-hole in the horizontal direction, and the width $W_1$ of the surface of the column insulation structure 60 facing the connecting layer 25 in the horizontal direction is greater than or equal to half of a width $W_3$ of the connecting layer 25 in the horizontal direction. On the other hand, a width $L_1$ of the surface of the column insulation structure 60 facing the connecting layer 25 in the vertical direction (Y direction) is greater than or equal to half of a width $L_2$ of the connecting layer 25 in the vertical direction.

By the arrangement that some column insulation structure is disposed between the first and second substrates of the display panel, the electric field generated by the voltage difference between the connecting layer and the common electrode can be shielded so as to protect the connecting layer from failure due the electric field.

While the invention has been described by way of example and in terms of preferred embodiment, it is to be understood that the invention is not limited thereto. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A display, comprising:
    a first substrate, having a display area and a non-display area outside of the display area;
    a second substrate, facing the first substrate;
    a common electrode formed on an inner surface of the second substrate;
    a plurality of pixel units, formed at the display area of the first substrate and configured to receive an output signal;
    a driving unit, formed at the non-display area of the first substrate and comprising:
    a first conductive layer, configured to transmit the output signal to the pixel unit;
    a first insulation layer, formed on the first conductive layer;
    a second conductive layer, formed on the first insulation layer;
    a second insulation layer, formed on the second conductive layer; and
    a connecting layer, formed on the second insulation layer, wherein both of the first insulation layer and the second insulation layer have a through-hole, respectively, and the connecting layers are electrically connected between the first conductive layer and the second conductive layer by passing through the through-holes; and
    a column insulation structure, corresponding to the connecting layer and formed between the first substrate and the second substrate,
    wherein the column insulation structure is spaced apart from the connecting layer by a distance, and a gap is formed between the column insulation structure and the connecting layer,
    wherein the column insulation structure is formed on the common electrode, and a voltage applied to the common electrode is different from a voltage applied to the connecting layer.

2. The display as claimed in claim 1, wherein the column insulation structure is located above the connecting layer.

3. The display as claimed in claim 1, wherein a width of a surface of the column insulation structure that faces the connecting layer in a horizontal direction is greater than or equal to half of a width of the connecting layer in the horizontal direction.

4. The display as claimed in claim 1, wherein a width of a surface of the column insulation structure that faces the connecting layer in a vertical direction is greater than or equal to half of a width of the connecting layer in the vertical direction.

5. The display as claimed in claim 1, wherein a width of the column insulation structure in a horizontal direction is greater than or equal to a width of the through-holes in the horizontal direction.

6. The display as claimed in claim 1, wherein a thickness of the column insulation structure in a vertical direction ranges from 0.5 um to 7 um.

7. The display as claimed in claim 1, further comprising a liquid-crystal material disposed in the display area, wherein the column insulation structure has a dielectric coefficient which is smaller than the highest dielectric coefficient of the liquid-crystal material.

8. The display as claimed in claim 1, wherein the connecting layer is formed of a material selected from ITO, IZO, Al, Cu, and Mo.

9. The display as claimed in claim 1, wherein the driving unit further comprises a supporting structure facing the column insulation structure and extruding in a direction toward the column insulation structure.

10. The display as claimed in claim 9, wherein the driving unit comprises two supporting structures, and the connecting layer is disposed between the two supporting structures.

11. The display as claimed in claim 9, wherein the supporting structures are electrical conductors or electrical insulators.

* * * * *